(12) United States Patent
Gonthier

(10) Patent No.: US 7,514,897 B2
(45) Date of Patent: Apr. 7, 2009

(54) CONTROL OF A TRIAC FOR THE STARTING OF A MOTOR

(75) Inventor: Laurent Gonthier, Tours (FR)

(73) Assignee: STMicroelectronics S.A., Montrouge (FR)

( * ) Notice: Subject to any disclaimer, the term of this patent is extended or adjusted under 35 U.S.C. 154(b) by 65 days.

(21) Appl. No.: 11/602,889

(22) Filed: Nov. 21, 2006

(65) Prior Publication Data

US 2007/0114964 A1 May 24, 2007

(30) Foreign Application Priority Data

Nov. 23, 2005 (FR) .................................. 05 53570

(51) Int. Cl.
*H02P 1/44* (2006.01)
(52) U.S. Cl. ..................... 318/751; 318/774; 318/778; 318/471
(58) Field of Classification Search ................ 318/751, 318/753, 774, 778, 782, 783, 788, 471
See application file for complete search history.

(56) References Cited

U.S. PATENT DOCUMENTS

| | | | |
|---|---|---|---|
| 3,978,388 A * | 8/1976 | DE Vries ..................... 363/45 |
| 4,408,607 A * | 10/1983 | Maurer ......................... 607/61 |
| 5,391,971 A | 2/1995 | Yamada et al. |
| 5,635,806 A * | 6/1997 | Wissmach et al. .......... 318/245 |
| 5,796,599 A * | 8/1998 | Raonic et al. ................. 363/57 |
| 6,137,275 A * | 10/2000 | Ravon ......................... 323/274 |
| 6,844,698 B1* | 1/2005 | Kwon et al. ................ 318/778 |
| 2005/0184699 A1* | 8/2005 | Unno .......................... 318/786 |

OTHER PUBLICATIONS

Patent Abstracts of Japan, vol. 5, No. 78 (E-058), May 22, 1981 & JP 56 025389, Mar. 11, 1981.
Patent Abstracts of Japan, vol. 8, No. 123 (E-249), Jun. 8, 1984 & JP 59 035575, Feb. 27, 1984.

* cited by examiner

*Primary Examiner*—Rina I Duda
(74) *Attorney, Agent, or Firm*—Lisa K. Jorgenson; James H. Morris; Wolf, Greenfield & Sacks, P.C.

(57) ABSTRACT

A method and a circuit for controlling a triac intended to be series-connected with a resistive element of positive temperature coefficient or which is at least capacitive, and a winding for starting an asynchronous motor, for supply by an A.C. voltage, the present invention including the steps of: detecting a voltage representative of the voltage across the series connection of the element and of the triac; comparing this detected voltage with respect to a threshold; and blocking a turning back on of the triac when the threshold has been exceeded.

18 Claims, 2 Drawing Sheets

CONTROL OF A TRIAC FOR THE STARTING OF A MOTOR

BACKGROUND OF THE INVENTION

1. Field of the Invention

The present invention generally relates to circuits for starting asynchronous motors powered by an A.C. voltage and, more specifically, to a circuit for controlling a triac driving an auxiliary winding of an asynchronous motor for starting thereof.

An example of application of the present invention relates to compressors which generally comprise such asynchronous motors powered by the A.C. mains voltage.

2. Discussion of the Related Art

FIG. 1 very schematically shows a conventional example of a circuit for controlling windings of an asynchronous motor. For simplification, the motor has been symbolized by a main winding Lm and an auxiliary winding Ls used for the starting. Main winding Lm is intended to be powered by an A.C. voltage Vac applied between two terminals 1 and 2. A switch K (for example, controlled by a thermostat Th, by the user, etc.) is interposed in series with winding Lm between terminals 1 and 2.

To start an asynchronous motor, it is necessary to create torque by means of a phase shift or by injecting a current greater than the current absorbed by winding Lm. Such is the function of auxiliary winding Ls, connected in parallel with the main winding.

This auxiliary or starting winding Ls is not intended to operate continuously. This is why it is generally associated with a resistive element 3 of positive temperature coefficient (PTC) having its resistance increasing along with temperature. Element 3 enables disconnecting the auxiliary winding once the motor has started, the current then flowing in the auxiliary winding being sufficient for the resistance of element 3 to be considered as opening the branch of the auxiliary winding.

To avoid that element 3 continuously dissipate power in the circuit, it is generally series-connected with a triac T. Thus, as illustrated in FIG. 1, auxiliary winding Ls in series with element 3 and triac T are connected in parallel with main winding Lm. The gate of triac T is connected to the junction point of a resistor R and a capacitor C, connected between terminals 1 and 2, a rectifying diode D being interposed between terminal 1 and resistor R with its anode on the side of terminal 1.

The circuit of FIG. 1 is described in document EP-A-0571956.

When a voltage Vac is applied between terminals 1 and 2 and switch K is turned on, the current which flows in winding Ls helps provide a torque to the motor to start it. In parallel, triac T is turned on by the gate current provided thereto by diode D and resistor R. A circuit 6 is used to discharge capacitor C to turn off triac T after a given time, which disconnects winding Ls. This time set by circuit 6 corresponds to the starting time. The starting time (conduction of winding Ls) is set by the time constant brought by resistor R and capacitor C. In such a circuit, resistive element 3 of positive temperature coefficient is used as a security for the case where triac T would be defective.

A disadvantage of the circuit of FIG. 1 is that it is used only once, on powering-on of the assembly. Due to the direct connection of diode D to terminal 1, it is no longer used when the thermostat turns off the motor, capacitor C remaining charged.

Even if the starting circuit (diode D, resistor R, capacitor C) were connected downstream of switch K (anode of diode D connected between switch K and windings Lm and Ls), the absence of the discharge circuit of capacitor C would adversely affect the restarting of the motor, after a turning-off/turning-on of the thermostat.

Further, most often, a normally-on switch (not shown in FIG. 1) used as a thermal protection (known under name KLIXON) is interposed between point 4 of interconnection of windings Ls and Lm and switch K. This protection switch is generally internal to the motor so that point 4 is, in practice, not accessible. In such a case, the circuit of FIG. 1 does not enable automatically restarting the motor on turning-on of switch KLIXON, after having undergone a thermal protection opening.

Assemblies (for example, from document U.S. Pat. No. 5,989,289) are also known in which a second resistive element with a positive temperature coefficient is provided to supply the triac gate. A disadvantage of this assembly is that the priming is late in the case where the second resistive element heats up, which generates electromagnetic noise. Another disadvantage of this type of assembly is a halfwave conduction.

SUMMARY OF THE INVENTION

The present invention aims at overcoming all or part of the disadvantages of known circuits for controlling a triac used to disconnect an auxiliary winding of a motor once it has been started.

The present invention more specifically aims at providing a re-triggerable solution, that is, enabling successive startings of the motor without generating an excessive heat dissipation in a resistive element.

The present invention also aims at providing an integrable solution.

The present invention also aims at providing a solution compatible with the operation of a thermal protection making one of the terminals of the motor winding not directly accessible.

To achieve all or part of these as well as other objects, the present invention provides a circuit for controlling a triac intended to be series-connected with a resistive element with a positive temperature coefficient or which is at least capacitive, and a winding for starting an asynchronous motor for supply by an A.C. voltage, comprising:

a circuit for detecting a voltage representative of the voltage across the series connection of said element and of the triac, and for comparing this voltage with respect to a threshold; and a circuit for blocking a turning back on of the triac when said threshold has been exceeded.

According to an embodiment of the present invention, said element is a resistor with a positive temperature coefficient.

According to an embodiment of the present invention, the circuit further comprises a circuit for controlling the triac at the voltage zero, controlled by said blocking circuit.

According to an embodiment of the present invention, said blocking circuit stores the information that said threshold has been exceeded.

According to an embodiment of the present invention, said detection and comparison circuit comprises:

a resistive dividing bridge receiving said voltage representative of the halfwave-rectified voltage across the series connection of the triac and of said element; and a zener diode having its threshold voltage setting the triggering of the blocking circuit.

According to an embodiment of the present invention, the blocking circuit comprises a switch selected from among a MOS transistor, a cathode-gate thyristor, a bipolar transistor, to ground the gate of the triac.

According to an embodiment of the present invention, said blocking circuit is sized to store the blocking for at least two halfwaves of the supply voltage.

The present invention also provides a circuit for controlling an asynchronous motor provided with a main winding and with an auxiliary starting winding, comprising at least one supply switch in series with said windings, and a triac in series with a resistive element of positive temperature coefficient, or which is at least capacitive, and the auxiliary winding, the motor control circuit comprising a circuit for controlling the triac.

The present invention also provides a method for controlling a triac intended to be series-connected with a resistive element of positive temperature coefficient or which is at least capacitive, and a winding for starting an asynchronous motor, for supply by an A.C. voltage, comprising the steps of:

detecting a voltage representative of the voltage across the series connection of said element and of the triac;

comparing this detected voltage with a threshold; and blocking a turning back on of the triac when said threshold has been exceeded.

According to an embodiment of the present invention, the information that said threshold has been exceeded is stored for at least two halfwaves of the supply voltage to maintain the triac blocking.

The foregoing and other objects, features, and advantages of the present invention will be discussed in detail in the following non-limiting description of specific embodiments in connection with the accompanying drawings.

DETAILED DESCRIPTION

Figure 1:
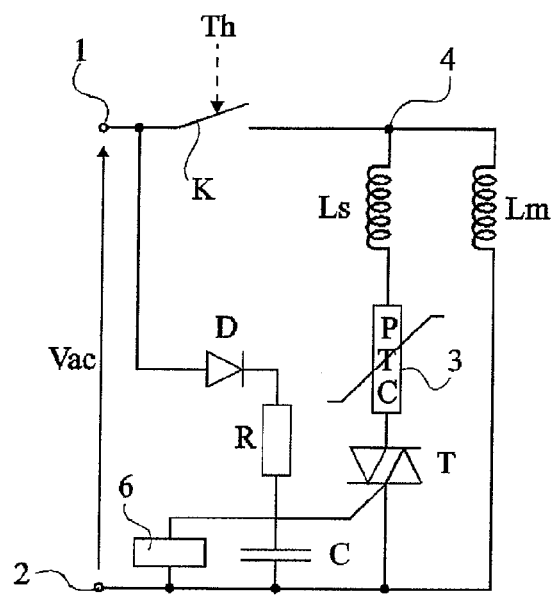
FIG. 1, previously described, shows a conventional example of a circuit for controlling a triac used to start an asynchronous motor of the type to which the present invention applies.

The same elements have been referred to with the same reference numerals in the different drawings. For clarity, only those elements that are necessary to the understanding of the present invention have been shown in the drawings and will be described hereafter. In particular, the details constitutive of an asynchronous motor have not been described in detail, the present invention being compatible with any conventional asynchronous motor comprising an auxiliary winding used for its starting.

Figure 2:
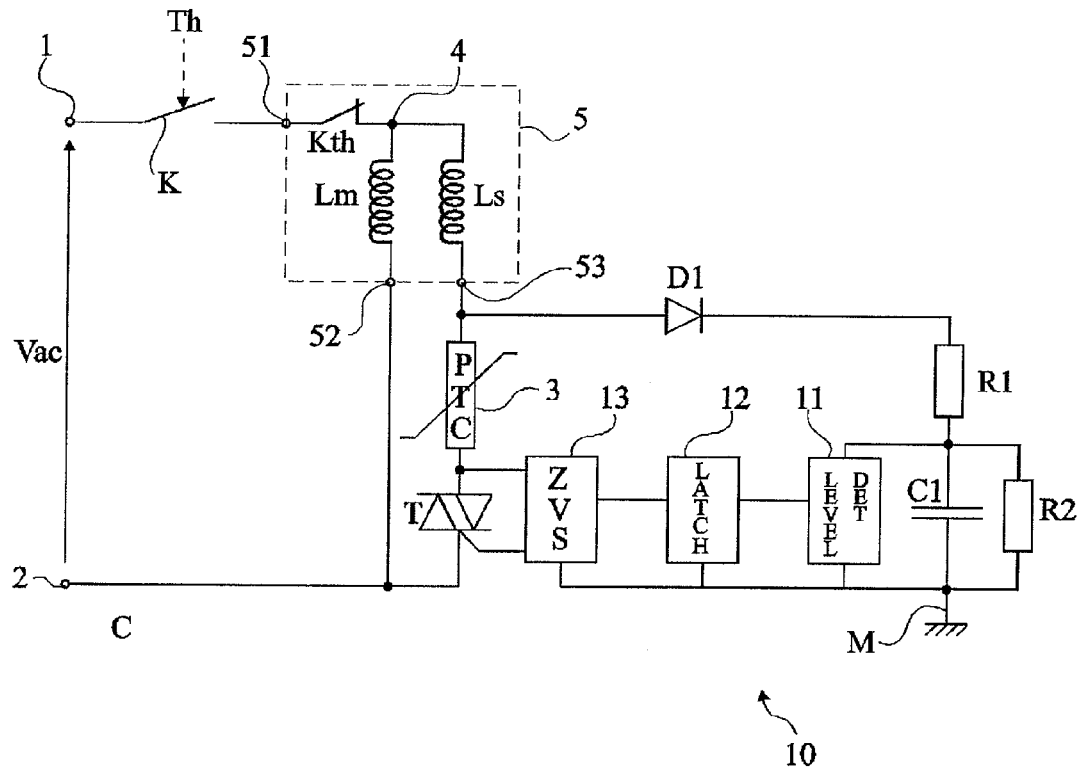
FIG. 2 very schematically shows in the form of blocks an embodiment of a circuit for controlling a triac in an asynchronous motor start circuit according to the present invention.

FIG. 2 very schematically shows in the form of blocks an embodiment of a circuit 10 for controlling a triac T used to start an asynchronous motor 5. In FIG. 2, motor 5 is symbolized by its main winding Lm, its secondary winding Ls, and a thermal protection switch Kth (KLIXON). Switch Kth connects a common node 4 of windings Lm and Ls to a terminal 51 intended to be connected, via a switch K (for example, controlled by a thermostat Th), to a terminal 1 of application of an A.C. supply voltage Vac between terminals 1 and 2. The other ends of windings Lm and Ls define terminals 52 and 53 accessible from the outside of motor 5. Terminal 52 is intended to be directly connected to the other terminal 2 of application of voltage Vac. As previously, terminal 53 is connected to terminal 2 by means of a resistive element 3 with a positive temperature coefficient (PTC) in series with triac T.

According to this embodiment of the present invention, a measure (block 11, LEVEL DET) of a voltage V53 present between terminal 53 and the ground is used, this voltage being representative of voltage V3 across resistive element 3 and triac T in series, to be compared with a threshold. This measurement is performed, for example, by means of a resistive dividing bridge formed of two resistors R1 and R2 in series between terminal 53 and ground M, with an interposed rectifying diode D1 having its anode connected to terminal 53. A first capacitor C1 is optionally used to filter possible disturbances.

When voltage V53 reaches a determined threshold, the corresponding information is latched (block 12, LATCH) or stored. Such a function is made necessary by the fact that the signal is variable with the periodicity of the supply voltage (generally, the mains).

Preferably, triac T is made conductive on each zero crossing of voltage V53 by means of a block 13 (ZVS) to limit electromagnetic disturbances by the turning-on of triac T. In this case, circuit 12 deactivates circuit 13 to prevent the turning back on of the triac at each halfwave beginning.

An advantage which already appears from the functional representation of FIG. 2 is that the circuit of the present invention automatically reactivates in case of a disappearing of supply voltage Vac across windings Lm and Ls, be it via control thermostat Th or by thermal security Kth integrated to the motor.

Figure 3:
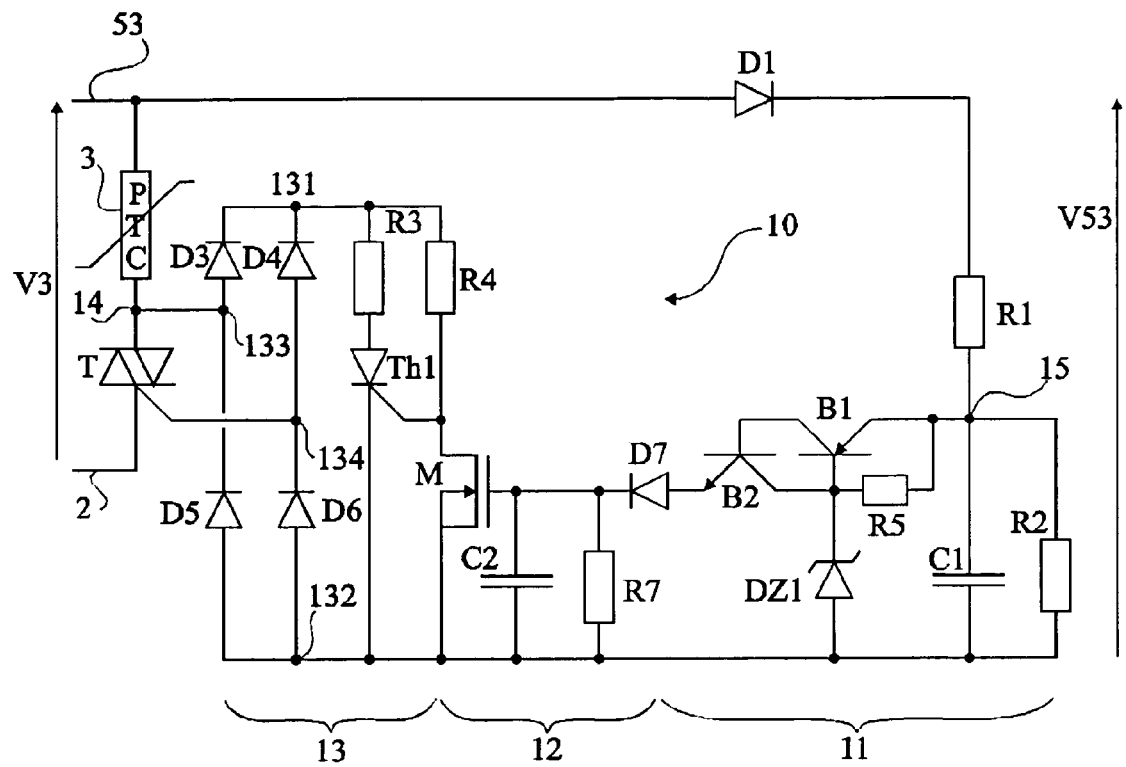
FIG. 3 is a detailed electric diagram of an example of embodiment of the control circuit of FIG. 2.

FIG. 3 shows the detailed electric diagram of a first example of embodiment of circuit 10 of FIG. 2. According to this example, control circuit 13 of triac T at the voltage zero comprises a cathode-gate thyristor Th1 having its anode connected, via a resistor R3, to a positive output terminal 131 of a fullwave rectifying bridge formed of diodes D3, D4, D5, and D6, the cathode of thyristor Th1 being connected to a second rectified output terminal 132 of the bridge. A first A.C. input terminal 133 of the bridge (anode of diode D3 and cathode of diode D5) is connected to junction point 14 of resistive element 3 and triac T. Second A.C. input terminal 134 of the bridge is connected to the gate of triac T. The gate of thyristor Th1 is connected to the junction point of a resistor R4 and of a MOS transistor M connected between terminal 53 and ground M (corresponding to the second rectified output terminal 132 of the bridge).

Assuming transistor M to be turned off (non-conducting), as soon as voltage V53 starts increasing a the beginning of the halfwave while resistive element 3 is cold, a current flows both through this element 3 and through resistor R4 (via the rectifying bridge) to trigger thyristor Th1. Once said thyristor has been triggered, the current flowing through element 3 and through resistor R3 is used to trigger thyristor triac T via two of the diodes of the rectifying bridge, of resistor R3, and of thyristor Th1. Thyristor Th1 is selected to be sensitive with respect to triac T and resistor R4 is selected to be greater than resistor R3 to reduce losses in the blocked state of triac T.

When resistive element 3 is hot, assuming that triac control circuit 10 does not turn off said triac once the motor has started, auxiliary winding Ls is disconnected due to the high resistance of element 3. The security brought by element 3 is thus preserved.

Level detection circuit 11 comprises the resistive dividing bridge formed of resistors R1 and R2, capacitor C1, and a zener diode DZ1 having its threshold value selected according to the desired triggering threshold.

Junction point 15 of resistors R1 and R2 is connected to the emitter of a first PNP-type bipolar transistor B1 having its collector connected to the base of a second NPN-type bipolar transistor B2, the base of transistor B1 being connected to the collector of transistor B2 and also, via a resistor R5, to point 15. Transistors B1 and B2 and resistor R5 form an anode-gate thyristor of the detection circuit. The anode of diode DZ1 is grounded while its cathode is connected to the base of transistor B1. As soon as the voltage between terminal 15 and ground M exceeds the threshold voltage of diode DZ1 (neglecting the voltage drop in resistor R5), transistor B1 turns on, which turns on transistor B2 which provides a locking of the conduction of transistor B1. Diode D1 provides a halfwave rectification for the voltage measured by bridge R1/R2.

Transistors B1 and B2 block as soon as the current in diode D7 disappears, when the voltage across capacitor C1 becomes lower than that across capacitor C2. Locking circuit 12 is required to store the detection performed by circuit 11 to turn on transistor M and prevent the restarting of circuit 13 by short-circuiting the gate and the cathode of thyristor Th1.

The locking circuit comprises a capacitor C2 grounding the gate of transistor M in parallel with a resistor R7 of high value. The emitter of transistor B2 is connected to the gate of transistor M by a diode D7, the anode of diode D7 being on the emitter side of transistor B2. Capacitor C2 is used to store the information detected by circuit 11 to turn on transistor M. The time constant of the resistive and capacitive cell C2-R7 is selected according to the period of the A.C. supply voltage (and thus to voltage V53) to store the information for at least one period. For example, for a 50-Hz A.C. voltage, a time constant on the order of 20 milliseconds will be selected. Resistor R7 is used to discharge capacitor C2 to enable resetting of the circuit when voltage V53 disappears for a sufficiently long time indicating a need to restart the motor.

Optional capacitor C1 of circuit 11 enables accelerating the charge of capacitor C2 at each halfwave and is used to filter possible disturbances present on voltage V53.

As a specific example of embodiment, an assembly such as shown in FIG. 3 is formed with components having the following values: R1=510 kiloohms, R2=30 kiloohms, R3=620 ohms, R4=R7=1 megaohm, R5=10 kiloohms, C1=C2=10 nanofarads, DZ1=15 volts, Vac=220 volts-50 Hz.

As a variation, transistor M is a bipolar transistor and the circuit is adapted for a current triggering.

Figure 4:
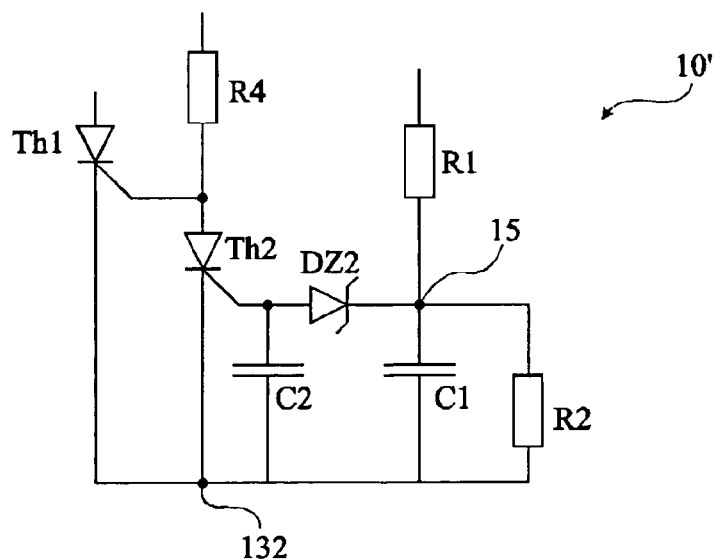
FIG. 4 shows a variation of the circuit of FIG. 3.

FIG. 4 shows an alternative embodiment of starting circuit 10' in which thyristor Th1 is blocked no longer by means of a transistor M but by means of a cathode-gate thyristor Th2 connecting the gate of thyristor Th1 to ground (terminal 132). A zener diode DZ2 connects the gate of thyristor Th2 to node 15 (anode of diode DZ2 on the side of thyristor Th2). As soon as the voltage at node 15 becomes greater than the threshold voltage of zener diode DZ2, a current flows through the gate of thyristor Th2 to trigger it. Preferably, a capacitor C2 between the gate of thyristor Th2 and the ground stores a sufficient power to maintain thyristor Th2 on for two halfwaves while current is only injected one halfwave out of two by the halfwave rectification performed due to diode D1 (not shown in FIG. 4).

An advantage of the present invention is that the control circuit preserves a setting to the on state of triac T to the voltage zero.

Another advantage of the present invention is that the circuit automatically reactivates in case of disappearance of the supply voltage.

Another advantage of the present invention is that is preserves the security brought by resistive element 3 of positive temperature coefficient in case of a failure of the triac.

Another advantage of the present invention is that it preserves the operation of the thermal motor protection.

Of course, the present invention is likely to have various alterations, modifications, and improvements which will readily occur to those skilled in the art. In particular, the sizing of the different circuit components is to be adapted to the application and especially to the motor and supply voltage features.

Further, although the present invention has been described in relation with a positive temperature coefficient resistor, it also applies to the starting circuit in which this element is replaced with a capacitive element or a resistive and capacitive element.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling a triac intended to be series-connected with a resistive element of positive temperature coefficient or which is at least capacitive, and a winding for starting an asynchronous motor for supply by an A.C. voltage, comprising:
    a circuit for detecting a voltage representative of the voltage across the series connection of said element and of the triac, and for comparing this voltage with respect to a threshold; and
    a circuit for blocking a turning back on of the triac when said threshold has been exceeded.

2. The circuit of claim 1, wherein said element is a resistor with a positive temperature coefficient.

3. The circuit of claim 1, further comprising a circuit for controlling the triac at the voltage zero, controlled by said blocking circuit.

4. The circuit of claim 1, wherein said blocking circuit stores the information that said threshold has been exceeded.

5. The circuit of claim 1, wherein said detection and comparison circuit comprises:
    a resistive dividing bridge receiving said voltage representative of the halfwave-rectified voltage across the series connection of the triac and of said element; and
    a zener diode having its threshold voltage setting the triggering of the blocking circuit.

6. The circuit of claim 5, wherein the blocking circuit comprises a switch selected from among a MOS transistor, a cathode-gate thyristor, a bipolar transistor, to ground the gate of the triac.

7. The circuit of claim 6, wherein said blocking circuit is sized to store the blocking for at least two halfwaves of the supply voltage.

8. A circuit for controlling an asynchronous motor provided with a main winding and with an auxiliary starting winding, comprising at least one supply switch in series with said windings, and a triac in series with a resistive element of positive temperature coefficient, or which is at least capacitive, and the auxiliary winding, comprising a circuit for controlling the triac of claim 1.

9. A method for controlling a triac intended to be series-connected with a resistive element of positive temperature coefficient or which is at least capacitive, and a winding for starting an asynchronous motor, for supply by an A.C. voltage, comprising the steps of:

detecting a voltage representative of the voltage across the series connection of said element and of the triac;

comparing this detected voltage with a threshold; and blocking a turning back on of the triac when said threshold has been exceeded.

10. The method of claim 9, wherein the information that said threshold has been exceeded is stored for at least two halfwaves of the supply voltage to maintain the triac blocking.

11. A circuit for controlling a triac when the triac is coupled in series with a resistive element and a starting winding of an asynchronous motor, the resistive element having a resistance that increases as the temperature of the resistive element increases, the circuit comprising:

a first circuit to detect a temperature-dependent voltage produced by the resistive element; and a second circuit to turn on the triac at zero crossings of the voltage across the triac and prevent the triac from turning on when the temperature-dependent voltage exceeds a threshold.

12. The circuit of claim 11, wherein the first circuit comprises:

a diode coupled to the resistive element; and a resistive voltage-dividing bridge coupled to the diode.

13. The circuit of claim 12, wherein the diode is coupled to a terminal between the resistive element and the triac.

14. The circuit of claim 11, wherein the first circuit further comprises a Zener diode that establishes the threshold.

15. The circuit of claim 11, wherein the second circuit detects a voltage across the triac.

16. A method of controlling a triac coupled in series with a resistive element and a starting winding of an asynchronous motor, the resistive element having a resistance that increases as the temperature of the resistive element increases, the method comprising:

detecting a temperature-dependent voltage produced by the resistive element;

determining whether the temperature-dependent voltage exceeds a threshold;

turning on the triac at zero crossings of the voltage across the triac; and preventing the triac from turning on when the temperature-dependent voltage exceeds the threshold.

17. The method of claim 16, further comprising:

storing an indication that the threshold has been exceeded, wherein the indication is stored for at least two half-waves of a supply voltage that drives the asynchronous motor.

18. The method of claim 16, further comprising:

reducing the magnitude of the temperature-dependent voltage to produce a reduced-magnitude temperature-dependent voltage; and comparing the reduced-magnitude temperature-dependent voltage to the threshold.

* * * * *